C. H. WILLS.
GEAR WHEEL.
APPLICATION FILED JAN. 17, 1921.
1,436,787.
Patented Nov. 28, 1922.
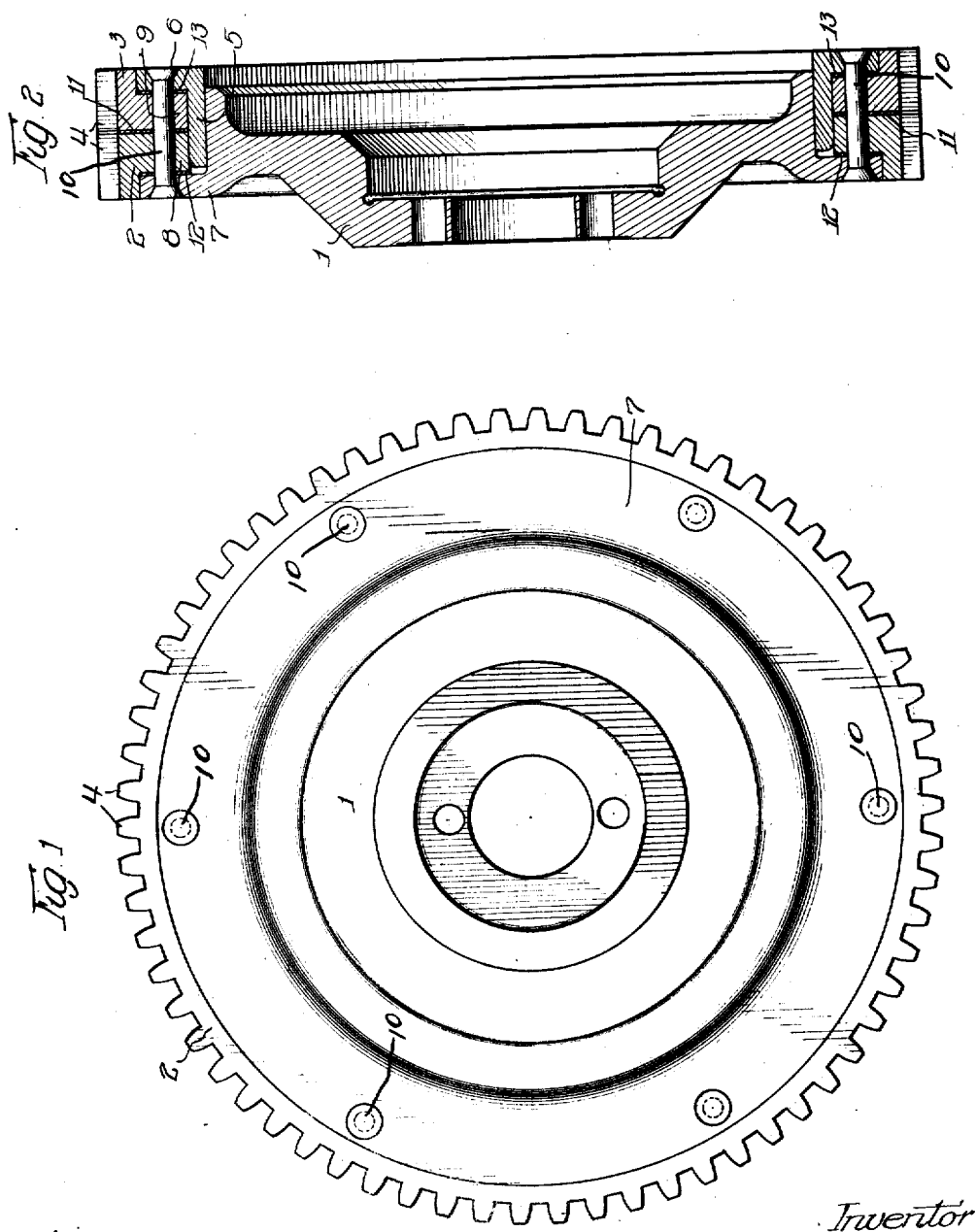

Patented Nov. 28, 1922.

1,436,787

UNITED STATES PATENT OFFICE.

CHILDE HAROLD WILLS, OF MARYSVILLE, MICHIGAN.

GEAR WHEEL.

Application filed January 17, 1921. Serial No. 437,683.

*To all whom it may concern:*

Be it known that I, CHILDE HAROLD WILLS, a citizen of the United States, residing at Marysville, in the county of St. Clair and State of Michigan, have invented certain new and useful Improvements in Gear Wheels, of which the following is a specification.

This invention relates to gear wheels.

The object of the invention is to provide a gear wheel bearing means adapted to damp out the sound vibrations of the gear and deaden the ring caused by the contact of the teeth of an engaging gear. The invention is of particular utility when embodied in the gears of motor vehicles in which the prevention of noise is a highly desirable end. The invention particularly aims to attain the above object by a construction which will enable the necessary rigidity of the wheel to be preserved and possess a metallic body in that part of the gear wheel in which the gear teeth are formed.

With the above object in view, the invention is embodied in preferable form in the construction hereinafter described and illustrated in the accompanying drawings, in which drawings—

Figure 1 is a face view of a gear wheel containing the invention; and

Figure 2 is a diametrical section of Figure 1.

Referring to the drawing, 1 is the web or central body portion of the gear wheel. The body of the rim in which the gear teeth are formed consists of two metallic rings 2 and 3 which are separated one from the other radially of the gear wheel, and axially and also radially from the body of the web of the gear wheel. In the particular gear wheel here shown the web is of steel to give strength and the circumferential ring members of iron to give wearing quality. The rim members have teeth sections 4 cut therein. Between the inner circumferential faces of the rim members and the outer circumferential face of the web body of the gear is mounted the axial flange 5 of a rim retaining member which has a radially projecting flange 6. The web body of the gear has a radial flange 7. The rim sections have radially extending flanges 8 and 9 which are adapted to be clamped between the flanges 6 and 7 by means of rivets or bolts 10 passing through all four flanges. The rim sections are thus rigidly secured to the web of the gear.

Between the radial inner faces of the two rim members is a ring 11 of paper or similar non-elastic, sound-damping material. Similar sound-damping members 12 and 13 are mounted respectively between the outer radial face of the rim member 2 and the flange 7 of the web, and between the rim member 3 and the flange 6 of the retainer. Owing to the arrangement of the sound-damping members in planes parallel to radii of the gear wheel, the circumferential meeting surfaces may be metallic and hence close fitting, and rigid connecting of the rim and web is attained and true concentricity of these parts insured.

I claim:

1. A gear wheel having a toothed rim separate from the body of the gear and comprising two sections separated radially, a radially flanged retainer member, a radial flange on the body of the wheel, said rim sections having radially extending parts between said flanges, members of sound-damping material between the adjacent radial surfaces of said sections and between said sections and the rim and retainer flanges, and means for securing said rim sections to the body of the gear.

2. A gear wheel having a toothed rim separate from the body of the wheel and comprising two sections separated radially, sound-damping material between the adjacent radial surfaces, a radially flanged retainer member, a radial flange on the body of the wheel, the rim sections having portions extending radially between the flanges, sound-damping material between the portions and flanges, and common means for securing said rim sections and retainer to the wheel body.

3. A gear wheel having a toothed rim separate from the body of the wheel and comprising two sections separated radially, sound-damping material between the adjacent radial surfaces, a radially flanged retainer member, a radial flange on the body of the wheel, the rim sections having portions extending radially between the flanges, sound-damping material between the portions and flanges, an axial flange on the retainer member extending between the rim sections and the body of the wheel and having metal to metal contact with the sections and wheel, and means for retaining the sections and retainer in place upon the wheel.

Signed at Marysville, Michigan, this 12th day of January, 1921.

CHILDE HAROLD WILLS.